US007707171B2

(12) United States Patent
Willcock

(10) Patent No.: US 7,707,171 B2
(45) Date of Patent: Apr. 27, 2010

(54) SYSTEM AND METHOD FOR RESPONSE CLUSTERING

(75) Inventor: Alex Willcock, West Sussex (GB)

(73) Assignee: Imagini Holdings Limited, London (GB)

( * ) Notice: Subject to any disclaimer, the term of this patent is extended or adjusted under 35 U.S.C. 154(b) by 598 days.

(21) Appl. No.: 11/227,255

(22) Filed: Sep. 16, 2005

(65) Prior Publication Data

US 2007/0067273 A1    Mar. 22, 2007

(51) Int. Cl.
*G06F 17/30* (2006.01)
(52) U.S. Cl. ................................ 707/603; 707/600
(58) Field of Classification Search ................ None
See application file for complete search history.

(56) References Cited

U.S. PATENT DOCUMENTS 5,668,965 A * 9/1997 Matsumoto et al. ......... 715/810

| | | | | |
|---|---|---|---|---|
| 2001/0007100 A1* | 7/2001 | Revashetti et al. | ............ | 705/26 |
| 2002/0052774 A1* | 5/2002 | Parker et al. | ................ | 705/10 |
| 2002/0103786 A1* | 8/2002 | Goel | ............................ | 707/3 |
| 2002/0152110 A1* | 10/2002 | Stewart et al. | ................ | 705/10 |
| 2004/0101212 A1* | 5/2004 | Fedorovskaya et al. | ..... | 382/305 |
| 2007/0067273 A1* | 3/2007 | Willcock | ...................... | 707/4 |

\* cited by examiner

*Primary Examiner*—John E Breene
*Assistant Examiner*—Thu-Nguyet Le
(74) *Attorney, Agent, or Firm*—Eagle IP Limited; Jacqueline C. Lui; Ho Chung Lui

(57) ABSTRACT

An interactive response, storage and tracking system delivered through an interactive medium (e.g. mobile, internet, kiosk in shops) whereby the provided visual stimuli enables consumers/respondents/users to select a stimulus that best answers their response to a given question. These visual 'answers' are then collated to form 'clusters' of respondents that share the same or similar preferences thereby enabling the viewer of such information to understand the propensity of a given 'cluster' to behave, react, respond, perform and/or purchase.

15 Claims, 11 Drawing Sheets

First of all, please answer a few questions about yourself.

date of birth [dd/mm/yy]

gender [f] [m]

marital status [▼]

number of children [▼]

post code [ ]

annual income [▼]

ethnic origin
*(optional)* [▼]

Fig. 2

SYSTEM AND METHOD FOR RESPONSE CLUSTERING

FIELD OF INVENTION

This invention relates to systems and methods for collecting information from an individual and/or a group of people, and in particular to gaining an understanding of an individual/s propensity to act, behave, perform, respond or purchase based on their response to certain stimuli via surveys, and market and personal profiling.

BACKGROUND OF INVENTION

Marketing surveys are known in the art. Typical market surveys uses questionnaires provided with a selection of written answers, or telephone enquiry with audio selection of answers. The answers collected often may not truly reflect the preferences of the user or do not allow a user to fully express his feelings or preferences. It is therefore an object of the present invention to provide an alternate system and method of profiling subjects.

SUMMARY OF INVENTION

Each and every buying decision is based on 2 aspects—quantitative (the brain) and qualitative (the heart). The consumer's buying decision after viewing an item 18 is influenced by his logical mind 12 side (quantifiable like value, price, performance statistics, durability of product, etc.), and an emotional heart side 14 (looks, feel, sensuality, design, happiness, excitement, sexiness, etc.) as illustrated in a person 16 in FIG. 1A. The present invention provides a technical way to try to capture the emotional side of people and recommend to companies the best course of action to enable the target market segment to favour their products/services.

Accordingly, the present invention, in one aspect, provides a computer system for profiling. The system includes a response item database comprising a set of non-text response items; an interactive module for communication with a user; a response database; an analysis module for analyzing the data in the response database; and a reporting module for presenting the analyzed data. The system is configured to perform steps of but not limited to presenting at least one query to a plurality of respondents, with each query being presented with a plurality of response items such that the respondent may select at least one preferred item as an answer to each the query; storing the respondents' preferred item from each query into the response database; compiling a plurality of the respondents' preferred items; and reporting the compiled preferred items to a viewer using the reporting module.

In the preferred embodiment, the system is further configured such that the reporting step is performed in an image format to facilitate a viewer's comprehension of the respondents' preferences. Furthermore, the analysis module is configured to rank each response item according to its popularity as the preferred item; and sends the ranking results to the reporting module. The latter will adjust the transparency of the display of each response item according to its ranking; and show it to the viewer.

In one preferred embodiment, the reporting module is interactive and is configured to receive viewer instructions from a viewer, and to send the viewer instructions to the analysis module for analysis and presenting the analysis results back to the viewer. The analysis module may further ranks each response item according to its preference among respondents; and tagging at least one high ranking response item with an emotional tag as pre-determined according to the corresponding query from which the ranking was derived.

In another preferred implementation, the interactive module, response item database and response database are provided within an offline response data collection system. In another implementation, the interactive module is able to communicate via the internet or other connections such as mobile telecommunications or other wireless or wired equipment.

The response item may be an image, a video clip, a piece of music, a smell or a combination thereof.

The present invention thus provides an interactive response, storage and tracking system delivered through an interactive medium (via, for example, mobile, internet, kiosk in shops, or manual interface) whereby the provided visual stimuli enables consumers, respondents or users to select an image/visual stimulus that best answers their response to a given question. These visual 'answers' are then grouped to form 'clusters' or groups of respondents that share the same or similar preferences thereby enabling the viewer of such information to understand the propensity of a given 'cluster' to behave, react, respond, perform and/or purchase.

This system gives the authorized 'viewer' of the compiled information access to and/or insights to the most likely choice of a consumer/respondent/user when exposed to the same or similar emotional response criteria.

As a result of such information, the system, methodology and/or database assigns certain emotions and preferences that enable an image to be tagged according to its relative response from the individual and/or group of respondents. This tagging includes, but is not limited to Emotional Response Indicators 62 and Direct Commercial Applicator 60 as shown in FIG. 9.

Emotional Response Indicators 62 refer to the attributes that this invention is able to assign to a given image thereby providing a qualitative and quantitative evaluation of an item. (Hence, for example, the system will ask "which picture makes you happy?", and the respondent will click on his/her preferred image (in this embodiment). Thereafter, when there are more images and clicks collected, if any authorized viewer wishes to have a "happy" image, the system will be able to provide recommendations. Conversely, if an authorized viewer wished to have a "sad" image, the system will also be able to provide recommendation based on the least clicked "happy" images in answer to the "which picture makes you happy?" question.)

Direct Commercial Applicator 60 refers to the resultant summation of an item's attributes and the system's ability to assign an appropriate commercial application and/or value to this item. This would provide a pre-analysis tool for companies to have a guide to what would probably work within the said target survey group. For example, a chocolate manufacturer targeting 28-15 year old would pick the most respondent images on font, colour for their packaging, and the appropriate images/pictures for their advertising campaign.

The Visual Response Methodology according to the present invention uniquely provides both qualitative and quantitative information on a given subject or question within the same question/answer system.

Authorized 'viewers' of the resulting collated/compiled/grouped information can interrogate the information in an infinite number of ways which include, but are not limited to viewing the visual responses of known profiles or clusters such as age, gender, income, nationality etc and yet unknown profiles such as those defined as, but not limited to, Visual Response Clustering, thereby referring to the clusters/groupings that will or may eventuate as a result of understanding and discovering the given groups propensity to respond to visual stimuli.

The method by which these authorized 'viewers' access and view the resulting collated/compiled/grouped information is in itself part of the present invention and has been designed to provide an infinite variety of visual manifestations of such information which include but are not limited to 'mood board' formats and an interactive visual mosaic whereby the authorized 'viewers' can select any given point or image and view the patterns/clusters/groupings that are associated with this given point or image through the means of numeric data such as percentages or popularity ranking and single dimensional opacity, transparency pictures, imagery or visual stimuli so that more important or higher scoring images are in the "foreground" and less relevant pictures, imagery or visual stimuli are less visible.

This system will be to provide specific pre-analysis guides to any individual or commercial enterprise that is interested, motivated and or required to understand the likely preferences or emotional responses of individuals and or groups, thereby enabling "mass customization".

BRIEF DESCRIPTION OF FIGURES

FIG. 2 is sample questionnaire according to one implementation of the present invention.

DETAILED DESCRIPTION OF THE PREFERRED EMBODIMENTS

As used herein and in the claims, "non-text" response items do not mean that no word or text can appear in any of the response items. It does not preclude some text or symbols appearing in the response item. Rather, "non-text" should be interpreted as meaning that the queries are not in a conventional text question-and-answer format. Some non-text items according to the present invention that may contains some text including, but not limiting to fonts, trademarks, logos, graphical or mathematical symbols.

Figure 1A:
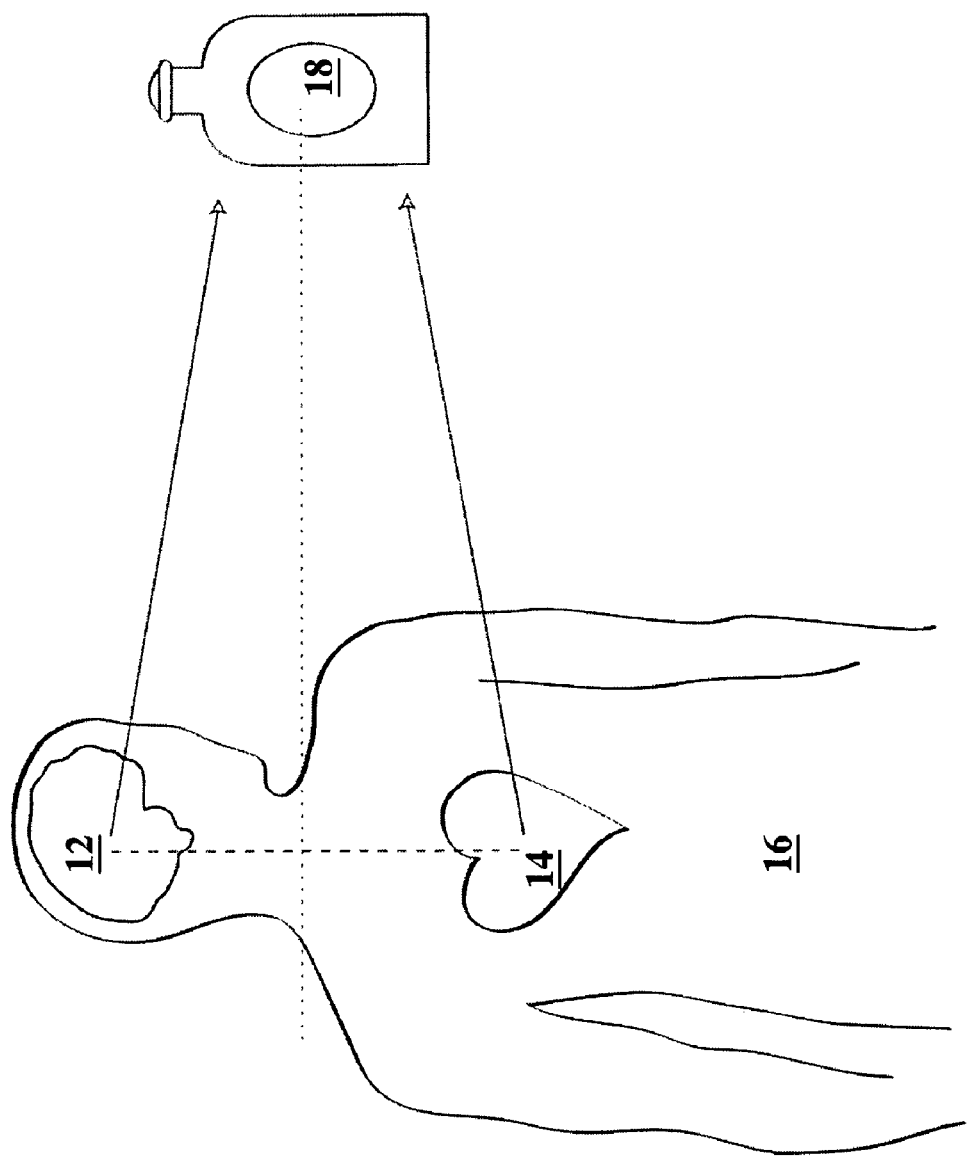
FIG. 1A is an illustration of the visual response methodology.
Figure 1B:
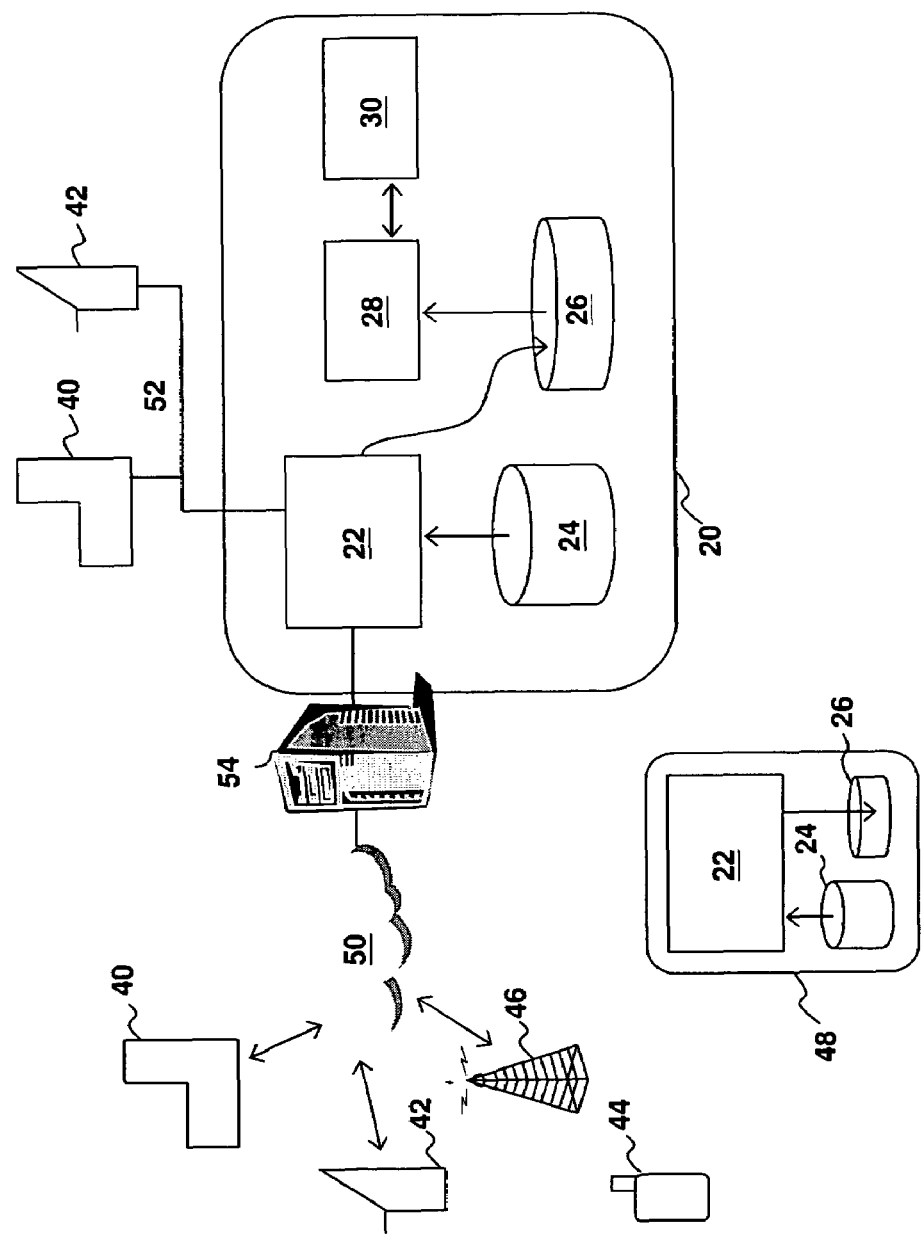
FIG. 1B is an illustration of a system for implementing one aspect of the present invention.

FIG. 1B shows the response clustering system 20. It consists of an interactive module 22 that delivers visual images from the response item database 24 to the respondent. In a preferred implementation, the response item database is an image database. For each respondent, an entry is created in the response database 26 that records the choices the respondent has selected in answering to the visual image stimulus presented by the interactive module 22. The interactive module 22 can deliver the visual images and collect respondents' feedback via a plurality of channels. In one embodiment, it can interface directly to desktop or portable computers 40 and kiosks 42 via a direct data interconnection 52 such as a local area network (LAN) or a leased line. In another embodiment, it can connect to the web server 54 that connects to the Internet 50. The web server 54 is a computer. Respondents can make use of an Internet browser either from their desktop or portable computers 40, the Kiosks 42 or their mobile phone 44 to interact with the interactive module 22 of the response clustering system 20. In the later case, it will go though a mobile operator 46.

In another embodiment of this invention, it is advantageous to have an off-line data collection system 48 that can collect the answers from respondents that may otherwise not possible to get hold of an on-line terminal such as 40, 42 or 44. This unit 48 also consists of an interactive module 22, the image database 24 and the response database 26. This unit 48 is preferably a portable device such as a display device or PDA that lacks on-line data communication facility to connect to the response clustering system 20. Nonetheless, an operator can carry this unit 48 to solicit responses from respondents the same way as the response clustering system 20 does; except that it will store the responses in its own response database 26. After collecting data from multiple respondents in the off-line mode, the operator can upload the data to the main response database 26 of the response clustering system 20.

When a new respondent starts to interact with the response clustering system 20, the interactive module 22 will first collect some basic information of the respondent. This is done by asking the respondent to fill in the entries as shown in FIG. 2. It should be obvious from persons skilled in the art that other information about the respondent can also be collected this way.

Figure 3A:
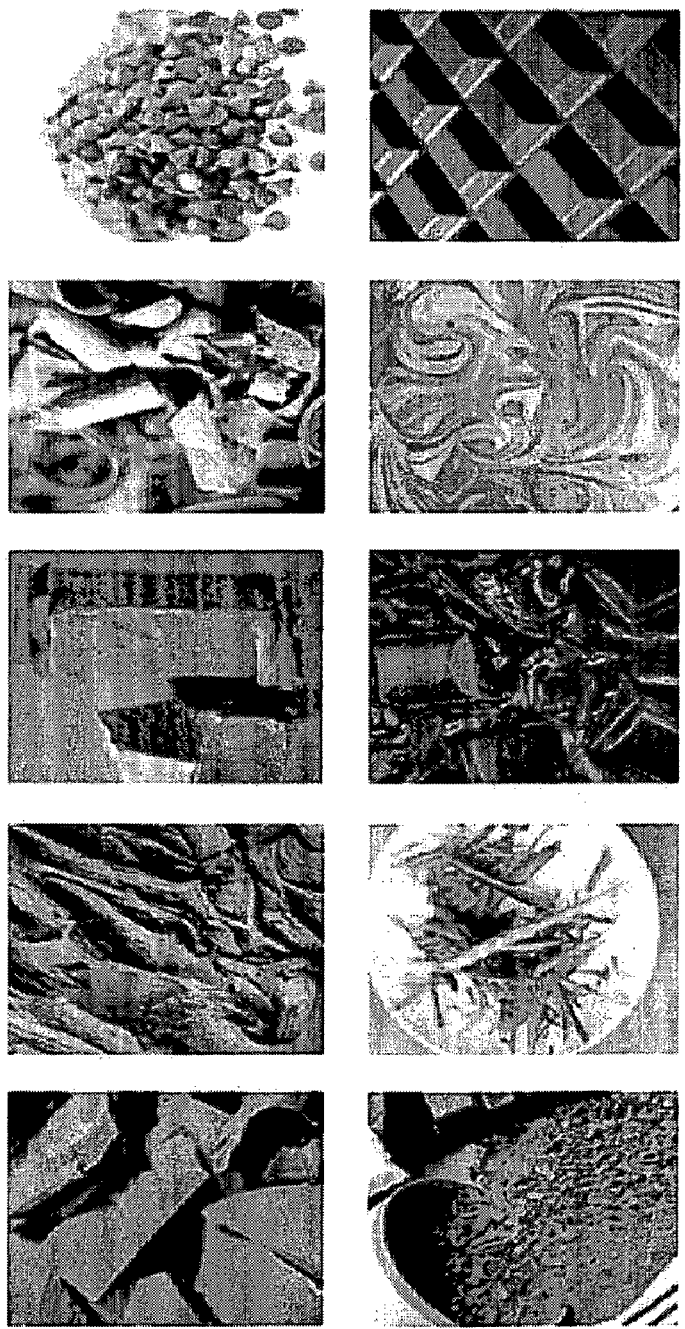
FIGS. 3A and 3B are sample queries according to one example of the present invention.
Figure 3B:
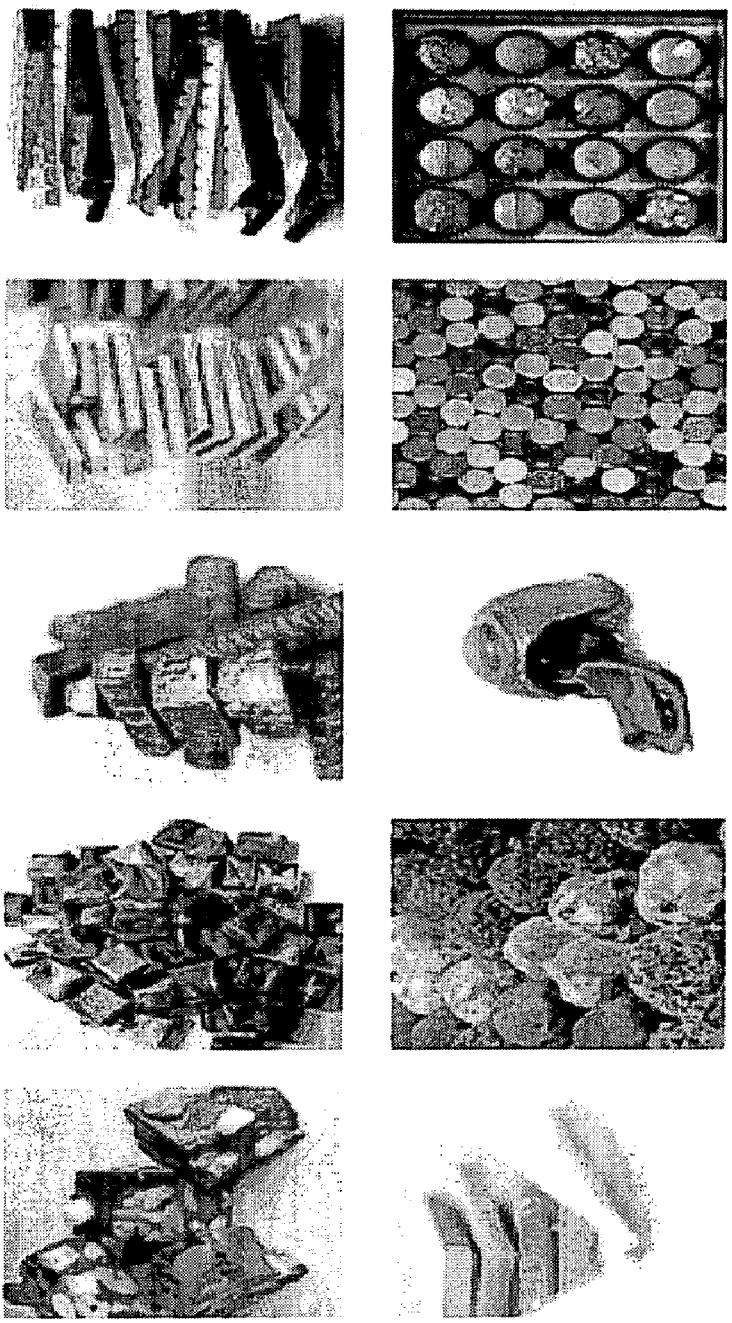

Afterwards, the interactive module 22 will prompt the respondent with a query and present a set of picture images from the image database 24 to the respondent (see FIGS. 3A and 3B for examples). The respondent answers the query by selecting the image that he likes best. The respondent's choice is recorded in the response database 26 under the respondent's entry. Afterwards, the interactive module 22 will select another query and its associated visual image stimulus to present to the respondent, and record the respondent's choice. This process is repeated for several cycles so that the system can collect and store more data about the respondent's preference to its response database 26.

In one embodiment, the interactive module 22 can query the respondent with a pre-defined, fixed sequence of questions and visual images. The query and the image stimulus are carefully selected so that the respondent's response will review his emotional state, his taste, psychological mood and otherwise subtle mental preferences that would otherwise be hard to articulate by conventional text-based query and answer system.

For the specific examples described below, the system as shown in FIG. 1B (with the corresponding reference numerals therein mentioned accordingly) is used to illustrate how to practice one aspect of this invention. In the example shown, the interactive module 22 queries the respondents six times, and for each query, ten images are displayed for the respondent to choose from. The data collected from the respondents are stored in the response database 26.

After the response clustering system 20 has collected a large amount of respondent preference data in its response database 26, authorized viewers can invoke the analysis module 28 to analyze the visual response of all the respondents.

The analysis module 28 performs a plurality of analysis. On the one hand, this module pre-computes certain statistics across the entire response database and stores the results therein. On the other hand, it responds to the authorized viewers specific request from the reporting module 30, performs the analysis immediately using the data in the response database, and reports the result to the authorized viewer.

Figure 4:
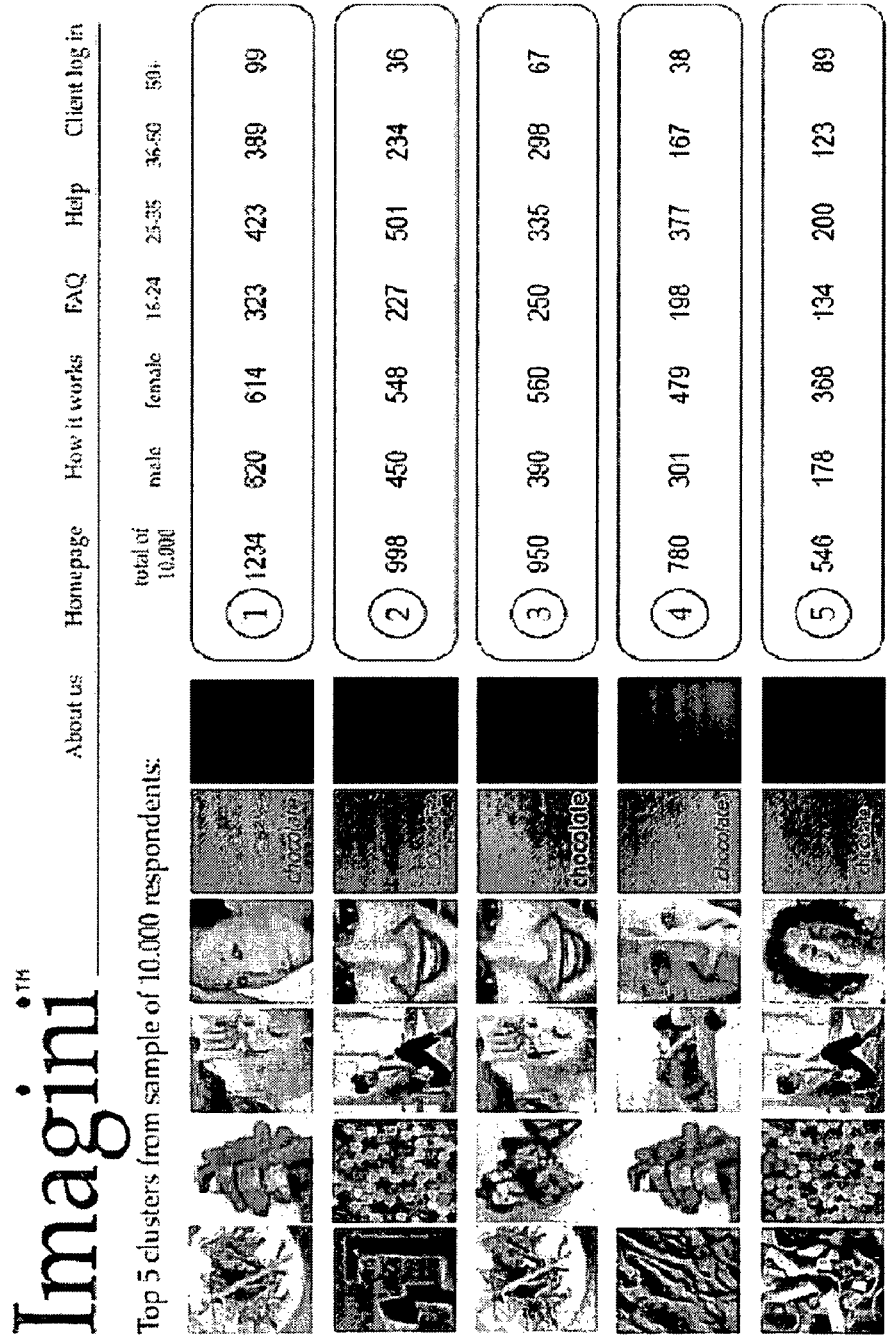
FIG. 4 shows a set of visual clusters according to the same example of the present invention.

In one preferred embodiment, the analysis consists of grouping a plurality of images into clusters, and for each cluster, tallying up the number of respondents that choose this cluster, ranking the cluster by its popularity and reporting the results to the authorized viewer. FIG. 4 is a specific realization of this kind of analysis. It depicts the top five most popular visual clusters, together with all the relevant non-visual cluster information such as age and gender, and present to the authorized viewer.

Figure 5:
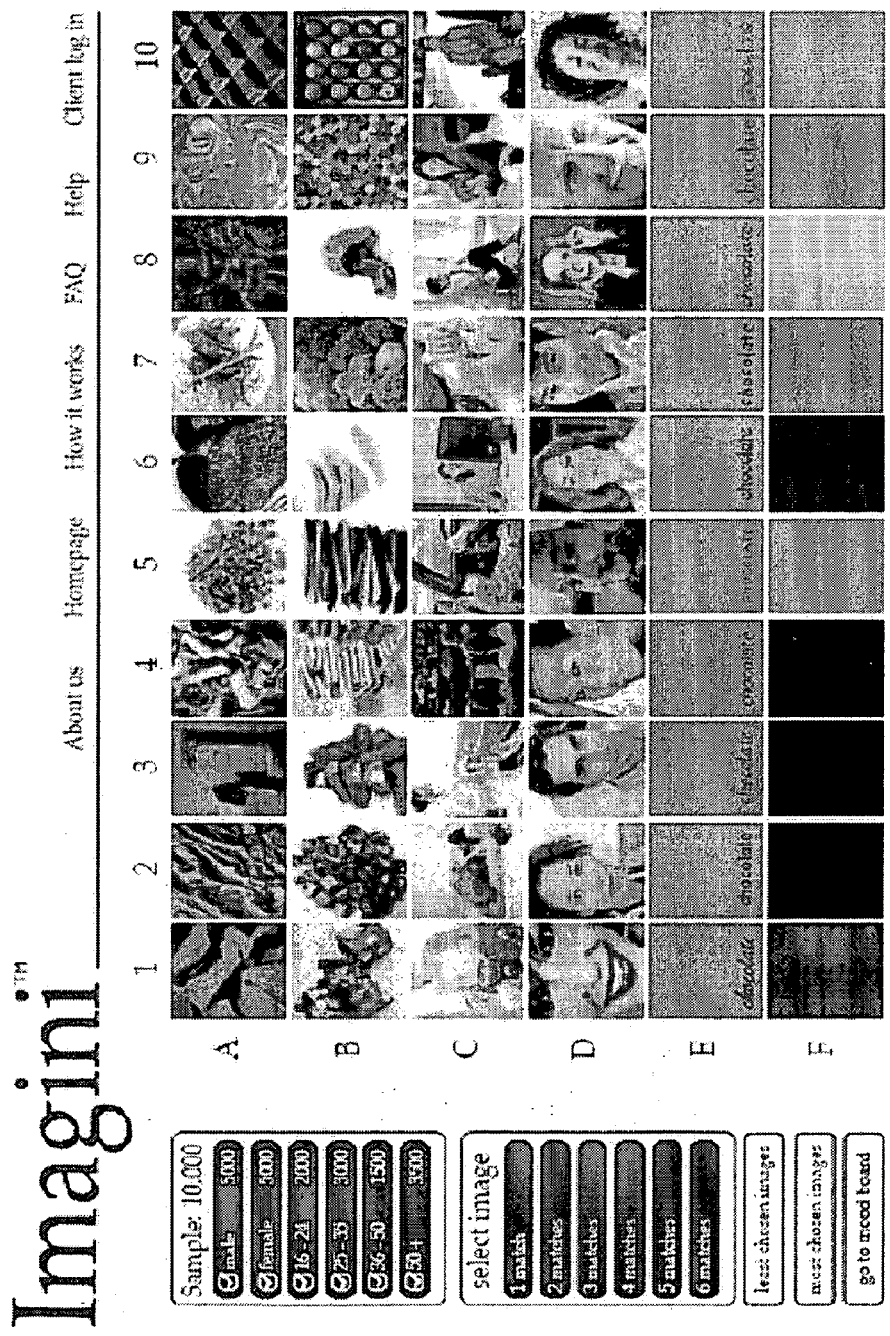
FIG. 5 is a report displayed according to one preferred implementation of the present invention.
Figure 6:
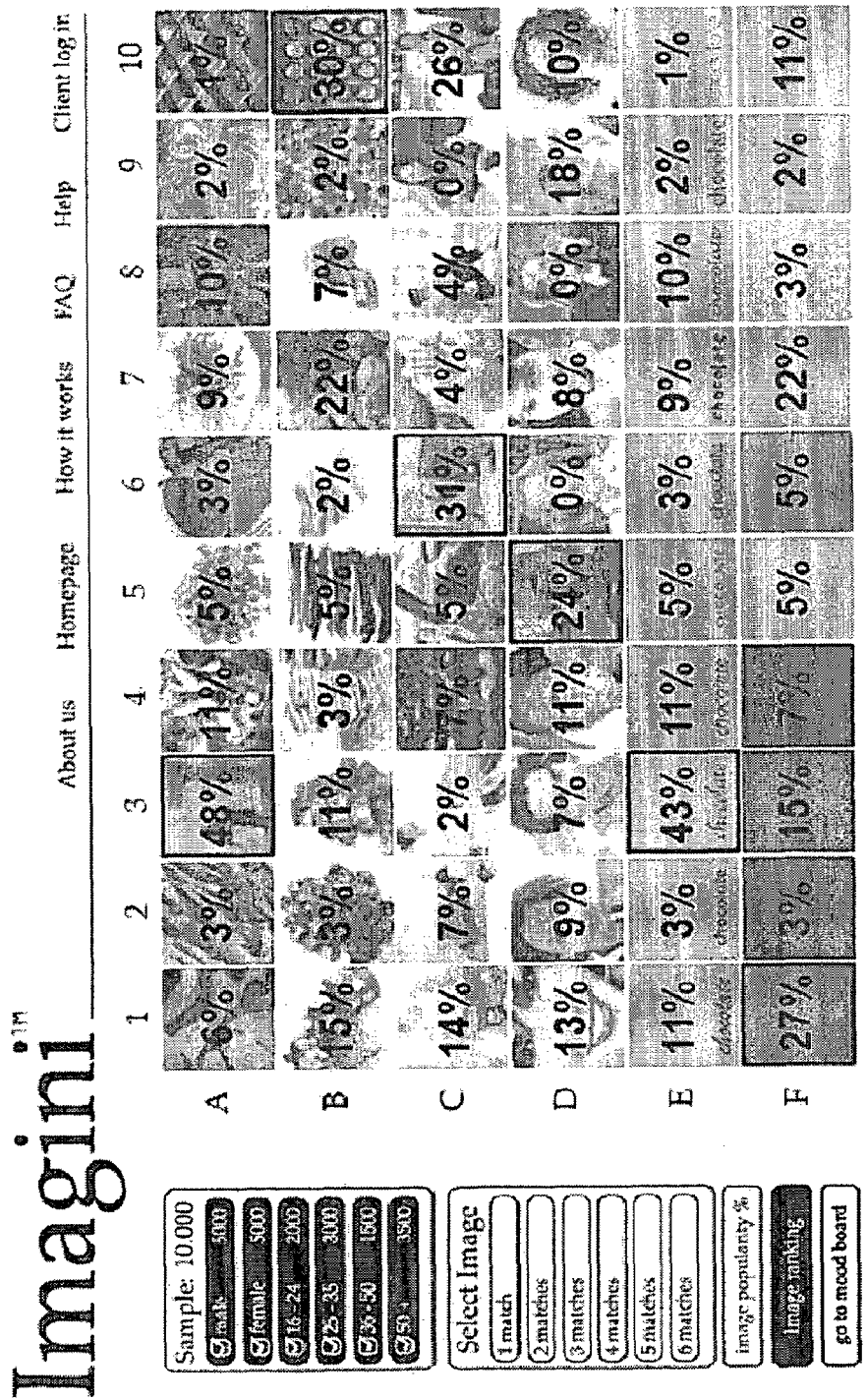
FIG. 6 shows a popularity ranking as displayed according to another preferred implementation.

In another preferred embodiment, the reporting module first displays an overview of all the images to the authorized viewer. The viewer can then navigate to other types of analyses in an interactive manner. FIG. 5 is one of the realizations of this approach. The right hand side of FIG. 5 shows the image icons from the image database 24. Each row corresponds to one query. (i.e. when the query is prompted, this row of images will be display by the interactive module 22 to solicit respondent's answer). The left hand side of FIG. 6 shows a column of mouse-selectable buttons. The top portion of the buttons shows the total size of the response database 26, and also its breakdown according to gender or age groups. The bottom portion of the buttons, when selected, generates different analysis reports to the authorized viewer.

From here, the viewer can select a particular image and interrogate accordingly. The reporting module 30 sends this request to the analysis module, which will compute the statistics relating to this image such as the total number of respondents choosing this image, and the cluster breakdown either by gender or by ages.

In FIG. 6, when the 'rank' button is selected, the reporting module 30 instructs the analysis module 28 to compute the popularity ranking of the images across each row. This figure shows the ranking in terms of percentage of which that item is selected as the respondents' preferred item based on the total number of respondents. Hence the sum of all percentage from the entire row is 100%. In a similar manner, it is also possible to rank the images across the entire database, and display its results in rank-order, percentage of popularity or the absolute number of respondents that chose a particular item.

Figure 7:
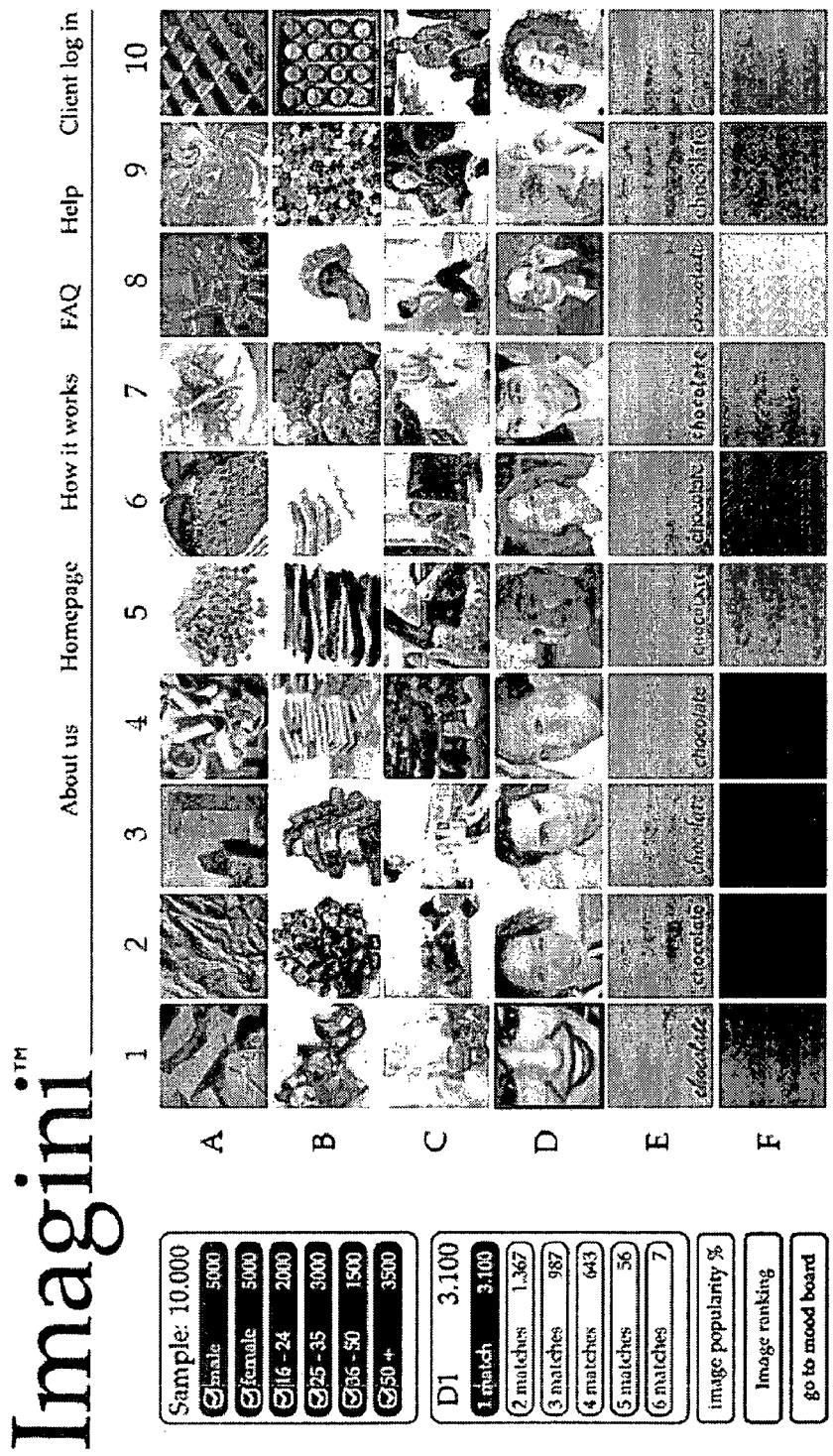
FIG. 7 shows another popularity ranking as displayed according to yet another preferred implementation.

When the authorized viewer selects one image (for example box D1 as shown in FIG. 7), the reporting module 30 displays the total number of respondents that also select this image in the button labeled '1 match'. In this specific example, it shows that 3100 respondents also selected this image. Other images become more transparent so as to emphasize the contrast against the selected image D1. The viewer can also see the breakdown of what these were made up of in terms of gender, age group, and other characteristics, etc.

Figure 8:
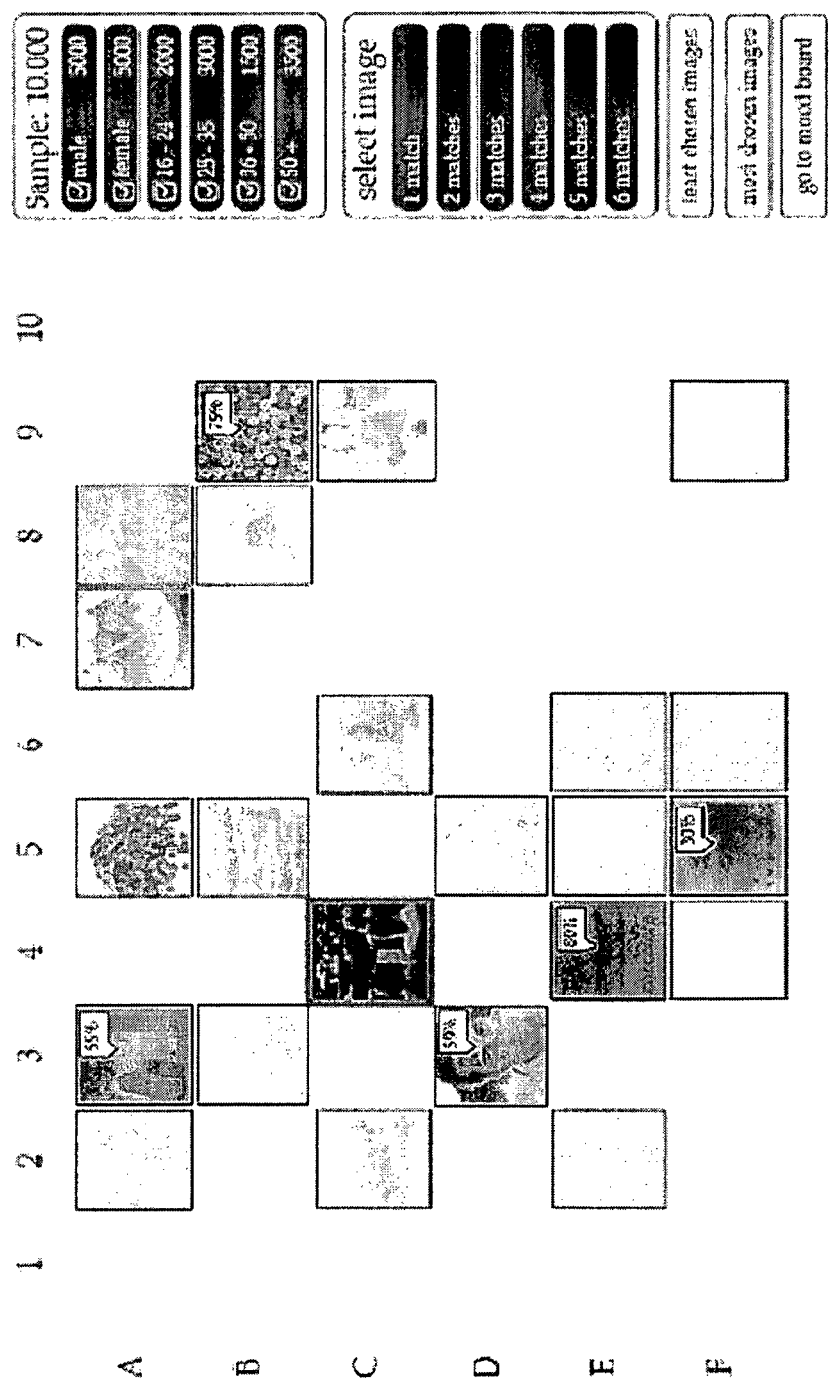
FIG. 8 shows the popularity ranking displayed in a progressively transparent format according to the rank order of each image.

To facilitate the authorized viewer's grasp of the information that a large response database contains, this invention optionally provides a progressively transparent image presentation technology to present such information in an easy-to-comprehend form. FIG. 8 demonstrates such an inventive idea. The highest rank image is display with 0% transparency (for example as seen in the image in box C4), while the lower ranking images are displayed in progressively higher percentage of transparency. For example, the second highest ranked image (box E4) is more transparent than the top (box C4), while the $3^{rd}$ (box B9) is more than the $2^{nd}$ (box E4), and so on. In this way, the authorized viewer can have a clear, global view of the relative importance of the images within the group.

Figure 9:
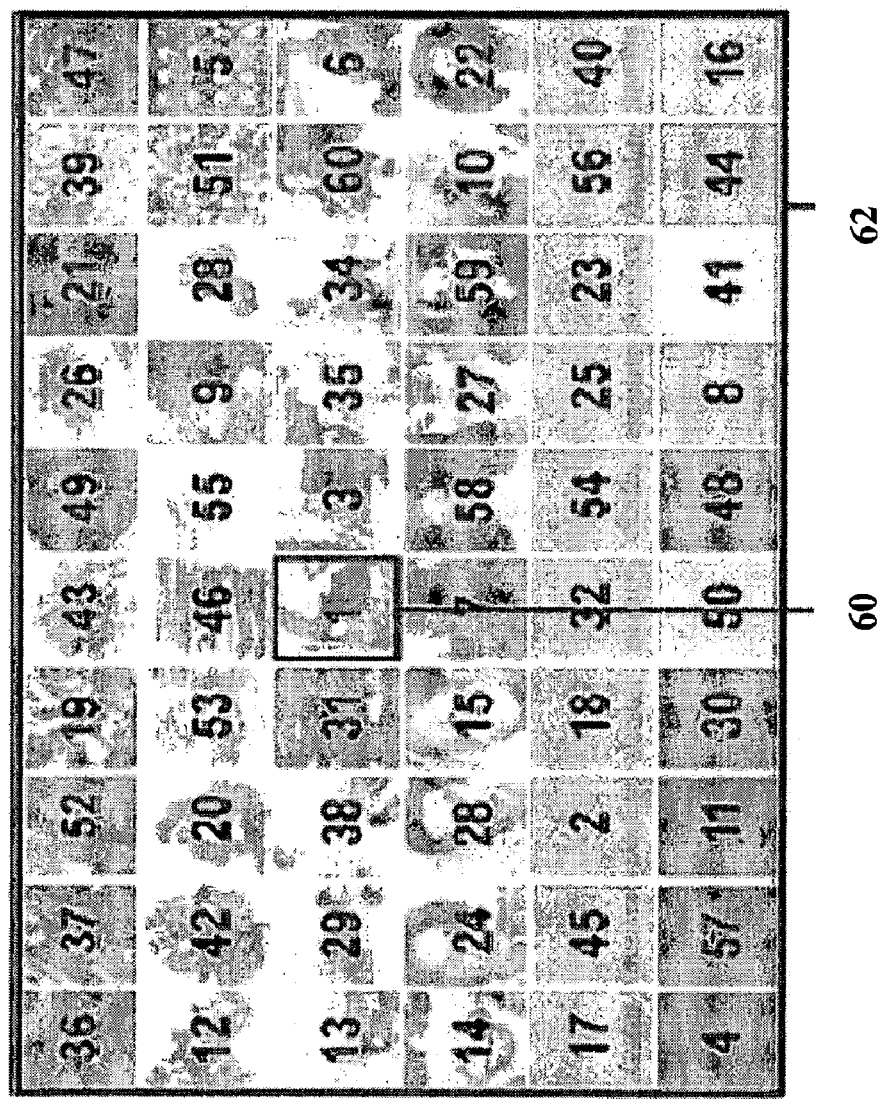
FIG. 9 shows the visual response methodology.

FIG. 9 is an example of a ranking of all the pictures by popularity, thereby allowing the company to know which is the more appropriate image to use sorted by importance or by their cluster group or profile group based on question asked and the resulting images clicked upon. One can interrogate the database by images or customer profile group to see the results such as the emotional response indicators 62 and direct commercial applicator 60 to assist a company in identifying various emotional preferences of their target users as described previously. In the most preferred embodiment, each market study will be done for each client, and will have its own set of questions and corresponding response images.

In yet another implementation of the analysis and reporting modules of the present system, the images of highest or higher ranking may be tagged with an emotion according to the query from which the ranking was derived. For example, a query might ask a respondent which image makes the respondents feel happiest. The top ranking image that received the highest number of preferences from the surveyed respondents can then be given an emotional tag of a "happy" image. This is like a pre-market analysis, or pre-prototyping—i.e. that the packaging, design, shape, colour, can be guided or be more based on the analysis of the present invention before even the prototype is made. Obviously, based on the result, the prototype will incorporate the most popular results.

The preferred embodiments of the present invention are thus fully described. Although the description referred to particular embodiments, it will be clear to one skilled in the art that the present invention may be practiced with variation of these specific details. Hence this invention should not be construed as limited to the embodiments set forth herein.

The detailed description describes the response item as an image simply for ease of description, and it should be noted that the same description applies to other types of non-text response items such as but not limited to video clips, textures, sounds and smell.

The above description provides an example of how the analysis report may be presented to the authorized viewer. It is obvious to a person skilled in the art that other variations of analysis reports can be devised based on the same principle.

What is claimed is:

1. A computer system for profiling comprising:
  a) a response item database comprising a set of non-text response items, each said non-text response item being different from another non-text response item;
  b) a web server;
  c) an interactive module for communication with a plurality of respondents via said web server to present at least one query to said plurality of respondents, each said query comprising a plurality of non-text response items selected from said non-text response item database for said plurality of respondents to select and for web server to collect answers of said query from said plurality of respondents; said answer comprising at least one preferred item selected by said plurality of respondents;
  d) an analysis module to perform a plurality of analysis methods on said answers; and
  e) a reporting module that allows an authorized viewer to select one of said plurality of analysis methods, instructs said analysis module to perform said selected analysis method, and displays the analysis result to said authorized viewer; said analysis result comprising at least one of said non-text response items and the transparency of each said non-text response item which is manually selected by said authorized view is changed to be lower than those non-text response items displayed by said reporting module is adjusted according to a ranking of said non-text response item in such a way that said transparency of each said non-text response item ranges from high to low when the ranking of said non-text response item ranges from low to high, such that lower ranking non-text response item displayed in high transparency and being less visible;

whereby said computer system provides said authorized viewer compiled information on the emotional preferences of said plurality of respondents and the most likely choice of said plurality of respondents when exposed to the same or similar emotional response criteria.

2. The system according to claim 1, wherein said reporting module displays all of said non-text response items that are presented to said plurality of respondents in said at least one query.

3. The system according to claim 2, wherein a numerical value is also displayed accompanying each said non-text response item displayed by said reporting module; said numerical value being computed by said analysis module when instructed by said reporting module upon a request from said authorized viewer.

4. The system according to claim 3, wherein said numerical value is the rank-order of said non-text response item, the percentage of popularity of said non-text response item or the number of respondents that choose said non-text response item.

5. The system according to claim 1, wherein when said authorized viewer selects a single non-text response item tat is displayed by said reporting module, said reporting module instructs said analysis module to compute statistics of said single non-text response item and display to said authorized viewer.

6. The system according to claim 1 wherein upon request from said authorized viewer, said reporting module instructs said analysis module to group said plurality of non-text response items into clusters; for each said cluster, said system further performing the following steps:
  a) tallying up the number her of said respondents that choose said cluster;
  b) ranking the cluster by its popularity; and
  c) reporting said ranking of said clusters to said authorized viewer.

7. The system according to claim 6, wherein said plurality of respondents that share the same or similar emotional preferences are grouped into one said cluster.

8. The system according to claim 6, wherein said reporting modules displays top five most popular clusters to said viewer; said reporting modules also displaying the breakdown of said cluster by gender or by ages.

9. The system according to claim 1 wherein said interactive module and non-text response item database are provided in an offline response data collection system.

10. The system according to claim 1, wherein said non-text response item is a picture image, a -video clip, a piece of music, a smell or a combination thereof.

11. A computer-aided method of capturing the emotional response of a subject by a computer system comprising:
  a) presenting at least one query to a plurality of respondents via a web server by an interactive module, each said query comprising a plurality of non-text response items selected from an non-text response item database for said plurality of respondents to select;
  b) collecting the answers of said at least one query by said interactive module from said plurality of respondents wherein said answer comprising at least one preferred item selected by said plurality of respondents;
  c) analyzing said answers by an analysis module to produce an analysis result based on an analysis method selected by an authorized viewer from a plurality of analysis methods; and
  d) displaying said analysis result by an report module to said authorized viewer; said analysis result comprising at least one of said non-text response items that are presented to said plurality of respondents in said at least one query items and the transparency of each said non-text response item displayed by said reporting module is adjusted according to a ranking of said non-text response item in such the way that said transparency of each said non-text response item ranges from high to low when the ranking of said non-text response item ranges from low to high. such that lower ranking non-text response item displayed in high transparency and being less visible;

whereby said computer system provides said authorized viewer compiled information on the emotional preferences of said plurality of respondents and the most likely choice of said plurality of respondents when exposed to same or similar emotional response criteria.

12. The computer-aided method according to claim 11, wherein a numerical value is also displayed accompanying each sad non-text response item displayed by said reporting module; said numerical value being computed by said analysts module when instructed by said reporting module upon a request from said authorized viewer.

13. The computer-aided method according to claim 12, wherein said numerical value is the rank-order of said non-text response item, the percentage of popularity of said non-text response item or the number of respondents that choose said non-text response item.

14. A computer-aided method according to claim 11 wherein said analysis method is ranking each said non-text response item according to its preference among respondents; Said analyzing step further comprising the step of tagging at least one high ranking response item with an emotional tag as pre-determined according to the corresponding query from which the ranking was derived.

15. A computer system for profiling comprising:
  a) a response item database comprising a set of non-text response items, each said non-text response item being different from another non-text response item;
  b) a web server;
  c) an interactive module for communication with a plurality of respondents via said web server to present at least one query to said plurality of respondents, each said query comprising a plurality of non-text response items selected from said non-text response item database for said plurality of respondents to select and for web server to collect answers of said query from said plurality of respondents; said answer comprising at least one preferred item selected by said plurality of respondents;
  d) an analysis module to perform a plurality of analysis methods on said answers; and
  e) a reporting module that allows an authorized viewer to select one of said plurality of analysis methods, instructs said analysis module to perform said selected analysis method, and displays the analysis result to said authorized viewer; said analysis result comprising at least one of said non-text response items and the transparency of said non-text response item which is manually selected by said authorized view is changed to be lower than those non-text response items which are unselected such that those unselected non-text response items are less visible;

whereby said computer system provides said authorized viewer compiled information on the emotional preferences of said plurality of respondents and the most likely choice of said plurality of respondents when exposed to the same or similar emotional response criteria.

* * * * *